United States Patent [19]

Curran

[11] Patent Number: 5,783,139
[45] Date of Patent: Jul. 21, 1998

[54] CERAMIC MATERIALS

[76] Inventor: Dennis John Gerard Curran, Willows, Horsham Lane, Wallis Road, Dorking, Surrey BH5 5RL, United Kingdom

[21] Appl. No.: 373,897

[22] Filed: Jan. 17, 1995

Related U.S. Application Data

[63] Continuation of Ser. No. 937,882, Oct. 19, 1992, abandoned.

[30] Foreign Application Priority Data

Apr. 18, 1990 [GB] United Kingdom ............... 9008723

[51] Int. Cl.[6] ................. D01F 9/10; C04B 35/00
[52] U.S. Cl. ............... 264/625; 264/626; 264/627;
264/639; 264/172.11; 264/172.14; 264/172.15;
264/DIG. 19; 264/DIG. 26; 419/10; 419/11
[58] Field of Search ................... 264/63, DIG. 19,
264/DIG. 26, 172.11, 172.14, 172.15, 625,
626, 627, 639; 419/10, 11

[56] References Cited

U.S. PATENT DOCUMENTS

| | | | |
|---|---|---|---|
| 4,010,233 | 3/1977 | Winter | 264/63 |
| 4,089,921 | 5/1978 | Dobo | 264/63 |
| 4,094,690 | 6/1978 | Morton | 264/63 |
| 4,222,977 | 9/1980 | Dobo | 264/63 |
| 4,310,651 | 1/1982 | Baney | 264/85 |
| 4,312,970 | 1/1982 | Gaul | 526/279 |
| 4,340,619 | 7/1982 | Gaul | 427/228 |
| 4,342,712 | 8/1982 | Yajima et al. | 263/63 |
| 4,482,689 | 11/1984 | Haluska | 528/25 |
| 4,698,417 | 10/1987 | Morgan | 528/395 |
| 4,770,935 | 9/1988 | Yamamura et al. | 425/366 |
| 4,772,524 | 9/1988 | Cobienz | 428/699 |
| 4,797,378 | 1/1989 | Sowman | |
| 4,806,612 | 2/1989 | Chandra et al. | 528/10 |
| 4,824,623 | 4/1989 | Rambosek | 264/DIG. 26 |
| 4,863,799 | 9/1989 | Mininni | 501/95 |
| 4,895,108 | 1/1990 | Caputo et al. | 264/81 |
| 4,961,889 | 10/1990 | Kodokura | 264/63 |
| 4,966,742 | 10/1990 | Khoury | 264/63 |

OTHER PUBLICATIONS

Encyclopedia of Polymer Science and Engineering, vol. 6, John Wiley & Sons, New York, pp. 830–831.
World Patents Index AN 88–231693, Jul. 1988.

*Primary Examiner*—James Derrington
*Attorney, Agent, or Firm*—Bacon & Thomas

[57] ABSTRACT

A ceramic fiber is made by spinning a plurality of polymeric materials each including at least one ceramic precursor into a composite fiber, and then pyrolysing the composite fiber to form a composite ceramic fiber of non-homogeneous composition. A preferred ceramic material for use in this method is made by pyrolysing an organo-metallic compound dispersed in an organic polymer carrier. The principal products are tailored matrix-compatible ceramic fibers for reinforcements, and have a core-sheath structure made by coaxial spinning methods. A core of desired mechanical properties, such as silicon carbide, is given a chemically appropriate surface layer. Transition metals compounds are preferred, in a range of organo-metallic ceramic precursors that include carborane derivatives. Allowed additives include metal-silicon compounds, other ceramics, corresponding metal oxides and elementary metals.

29 Claims, 1 Drawing Sheet

CERAMIC MATERIALS

This application is a continuation of application Ser. No. 07/937.882, filed Oct. 19, 1992, now abandoned.

This invention relates to ceramic materials. It is concerned with methods of making such materials, and with the materials so made. Of particular interest are ceramic fibres, which may be made with a wide range of compositions and structures.

Ceramics may be of a variety of compositions, including totally non-metallic materials such as silicon carbide. However, this invention is especially concerned with the incorporation of metals into ceramics, and references to ceramics herein refer particularly to simple binary or more complex solid inorganic compounds between metals and non-metals, excluding salts. Fibres containing such ceramic compounds will be referred to herein as ceramic fibres, or ceramic-containing fibres. These materials especially include compounds between transition metals on the one hand and carbon on the other hand, optionally with silicon, boron and nitrogen.

References to fibres are intended also to include filaments, ie long or continuous fibres. The fibres are generally manufactured as filaments. Short fibres can be made from the filaments by chopping or other processes.

Non-fibrous ceramic materials can be made by many known methods. It is well known to prepare ceramic materials by chemical vapour deposition techniques, or by pyrolysis of many different starting materials. However, in some respects these methods are rather crude and do not permit very good control of the nature and composition of the final product.

Known methods of preparing metal-containing ceramics in fibre form include first forming a metal-polymer compound, next spinning it to a fibre, and then pyrolysing the fibre. In this context U.S. Pat. No 4,762,895 is of interest in that it alludes to a number of examples of such methods, with particular reference to metallo-polysilanes. The order of the first two steps can be reversed, by first spinning a polymer mixed with a reactive metal compound before then reacting the two in the fibre to form the metal-polymer compound, followed by the pyrolysis step. In this latter case, exemplified by UK Patent No 1377065, reactive metal compounds such as $TiCl_4$ which are present in the polymer during spinning can be a hazard and a limitation on the process.

The properties of the spun fibre depend on the nature of the metal-containing polymer from which it is made; and the composition of the pyrolysed ceramic fibre, including its metal content, depends on the chemistry of the polymer. The availability of suitable metal-containing polymers restricts the range of products that can be made by these methods.

A particularly important use of ceramic fibres is as reinforcements for glass, metal and ceramic products, to prevent catastrophic failure of the products under stress. A serious problem can be that the fibre that in itself has good properties from a mechanical point of view may not be compatible with the matrix into which it is to be incorporated as a reinforcement. To take silicon carbide fibres as an example, these may experience chemical exchange reactions with a metal matrix, or may be virtually absorbed in a similar ceramic matrix when the material is densified to near 100% of theoretical.

The present invention is concerned to provide methods of making a range of ceramic materials that can be used as fibres, but are not limited to fibres, which enable the products to be tailored and selected for a wide range of purposes.

According to one aspect of the present invention, a method of making a ceramic fibre comprises spinning a plurality of polymeric materials each comprising at least one ceramic precursor into a composite fibre, and thereafter pyrolysing the composite fibre to form a composite ceramic fibre of non-homogeneous composition.

According to another aspect of the invention, a method of making a ceramic material suitable for use in the above method of making a fibre comprises pyrolysing a dispersion of an organo-metallic ceramic precursor in a carrier comprising an organic polymer.

The nature of a ceramic material produced by the invention is governed firstly by the natures of the ceramic precursor and the carrier polymer, and secondly by the conditions of pyrolysis, such as temperature and atmosphere. By selecting appropriate combinations of these variables, a wide range of ceramic materials can be produced with properties suited to a variety of end uses.

In general, for the production of composite fibres, the ceramic precursors are not limited to organo-metallic materials; that is to say, silicon carbide type and other non-metallic ceramic precursors may be used. The following description will refer mainly to the organo-metallic precursors, for convenience, but the production of composite ceramic fibres by this invention is not limited to the use of these specific starting materials. As far as composite fibres are concerned, references to organo-metallic ceramic precursors apply to other ceramic precursors as well.

In the production of ceramics, the invention immediately affords a number of major advantages. First, many interesting organo-metallic compounds can now be used, supported in a polymer, that previously could not readily be used as starting materials, because of difficulties in handling the materials. Second, the use of at least two components, namely at least one organo-metallic ceramic precursor and at least one organic polymer, gives much more scope for adjusting the chemical composition to be subjected to pyrolysis. Thirdly, the dispersion of organo-metallic ceramic precursor in the polymer can allow mixing of the distinct starting materials down to a molecular level, much more intimately than is possible by mixing separate powders, and this can give a more homogeneous product.

The organic polymer carrier for the organo-metallic ceramic precursor may be a polymer solution, and the dispersion of the organo-metallic ceramic precursor may be obtained by first dissolving or dispersing the precursor in the carrier, and then removing solvent if necessary to form a solid or plastic mass before pyrolysis.

The ceramic precursor in its organic polymer carrier can be shaped before the pyrolysis step, and a preferred shaping process is fibre spinning. It should be understood that many other shaping processes can be employed, as may be appropriate for the end use envisaged for the ceramic material. If a powder is required, comminution of the ceramic precursor in its carrier and/or of the pyrolysed product may be suitable. The products of the invention are typically in the form of fibres, products obtainable from fibres, and powders.

The following description will refer principally to use of the invention for the production of ceramic fibres, but it should be understood that the references to fibres can often be read as references to other shaped products, replacing spinning by other shaping processes, and so on.

In order to produce fibres, the invention includes the step of spinning the polymer into a fibre containing the ceramic precursor; and the fibre is thereafter pyrolysed to form a ceramic fibre.

A fibre spun by this method may have its mechanical properties before pyrolysis, especially its physical strength, determined by the organic polymer with which the organo-metallic ceramic precursor is spun; and a variety of precursors may be incorporated into the fibre in order to give great flexibility in the chemical composition of the fibre and, in consequence, in the composition and properties of the ceramic fibre after pyrolysis. The presence of the metals and non-metals in the fibre before pyrolysis in controlled amounts as selected chemically bound species in intimate contact facilitates good control of the ceramic fibre product.

It is an important feature of the invention that composite or multicomponent ceramic fibres may be formed. This may be done by conjugate spinning of fibres, by coating a spun fibre with further components before pyrolysis, by blending different kinds of fibre between the spinning and pyrolysis steps of the invention, or by any other suitable method. It will be appreciated that similar approaches can be made to the production of other products than fibres, with a composite nature.

Accordingly, the invention may be used to produce simple or composite ceramic fibres. Simple fibres are those produced by spinning from one solution or dispersion of organo-metallic ceramic precursor in an organic polymer. Composite fibres are those produced by combining, during or after spinning but before pyrolysis, a first polymeric material comprising a ceramic precursor, with a second polymeric material comprising a ceramic precursor. Either or both polymeric materials may be a solution or dispersion of the same or different organo-metallic ceramic precursor in an organic polymer.

By organo-metallic ceramic precursor is meant an organo-metallic compound or a mixture of organo-metallic compounds which upon pyrolysis under the conditions of the method according to the invention yields a metal:carbon ceramic compound. Examples of such metal carbide ceramic compounds are carbides, carbosilicides, carboborides, carbonitrides, silicocarboborides, and silicocarbonitrides. Further ceramic precursors may be present in the polymer, whether organo-metallic or not.

The metal or metals in the organo-metallic ceramic precursor may suitably be selected from the transition metals; or may in particular be one or more selected from titanium, vanadium, chromium, manganese, iron, cobalt, nickel, copper, zinc, aluminium, gallium, yttrium, zirconium, niobium, molybdenum, ruthenium, rhodium, palladium, lanthanum, hafnium, tantalum, tungsten, rhenium, osmium, iridium, platinum, gold, mercury and the lanthanoids.

The following non-metals in particular may be present with the metal to form the ceramic compound: carbon, boron, silicon, nitrogen, phosphorus, sulfur, germanium, and arsenic.

The organo-metallic ceramic precursor may take many forms. It may even be polymeric in itself. Thus on the one hand it may be a metal-containing polymer; on the other hand it may be a metal coordination compound, or other organo-metallic compound.

Examples of metal-containing organic polymers include those compounds and polymers that have repeated metal-oxygen units in their skeletons, such as metalloxanes or oxyhalides, including for example the compounds $(C_5H_5)_2MX.O.MX(C_5H_5)_2$ and $C_5H_5.MX_2.O.MX_2C_5H_5$, where M represents a metal, such as Ti or Zr, and X represents a halogen, typically Cl or Br, and polymetalloxanes, such as, for example, the cyclic tetramer $[(C_5H_5)_2TiClO]_4$ and analogs.

Other suitable organo-metallic families include transition metal diketonates, formed by reaction of a diketone such as acetylacetone with, typically, a cyclopentadiene of titanium, vanadium, chromium, manganese, iron or nickel.

Other suitable organo-metallic ceramic precursors include the metal alkoxides, particularly transition metal alkoxides (including phenoxides) such as those formed by the reaction of a lower alkanol (up to C6) with a metal chloride or a complex thereof. Higher alkanols may result in excessive dilution of the metal content. The preferred metals include titanium, zirconium, vanadium, niobium, hafnium, chromium, nickel, manganese, iron, molybdenum, tantalum and rhenium. Similarly, suitable metal phenoxides include particularly those of titanium to nickel, zirconium to palladium, and lanthanum to platinum (including the lanthanoids).

A further class of organo-metallic ceramic precursors is exemplified by silanol derivatives, such as alkyl- or aryl-siloxy metal cyclopentadienes, eg methyl-, ethyl- or phenyl-siloxy (metal) cyclopentadiene compounds, and dicyclopentadiene (metal) oxysilanol, where (metal) can be titanium, zirconium, hafnium, vanadium and others.

Yet further organo-metallic ceramic precursors may be bimetallic oxy compounds.

The precursor may frequently comprise a metal-organic coordination complex, such as pi-complexes with, typically, cyclopentadiene. These may be dimers or oligomers, the units being bonded by, for example, chloride, boride, hydrogen or metal-to-metal bridging.

Although certain organo-metallic compounds are of course very reactive, and need careful handling, it is often possible to select the less hazardous compounds for use in the invention.

One general class of organo-metallic ceramic precursors that is especially preferred, in accordance with the invention, comprises metal derivatives of the carboranes. These compounds may include features of the ceramic precursors discussed above, but have in common that they include a carborane moiety.

The ceramics obtained from carborane precursors, after pyrolysis in a polymer carrier, contain mixtures of metal carbides, borides and carboborides.

Carboranes are in themselves well known. Structurally, they correspond to boranes in which one or more carbon atoms have been added to the cage formed by the boron skeleton. The cage may be closo-, nido- or arachno- according to the degree of openness of the structure. Carbon atoms may be found at different locations; for example, in the $B_{10}C_2$ compounds, ortho-, meta- and para- isomers of dicarbadodecaborane $(B_{10}C_2H_{12})$ occur, reflecting the locations of the two carbon atoms at the 1,2, 1,7 and 1,12 positions respectively.

They are made by known methods, and can be reacted to form a variety of derivative compounds with bonding to the carbon atom or atoms. The derivatives used in the invention have a metal atom present, normally assumed to be with metal to carbon bonding, or as pi-bonded coordination complexes; but potentially with metal to boron bonding as well.

The major methods of preparing metal-carborane compounds are well known. These methods include such techniques as the following.

Reactive alkyl or aryl metal compounds may be used, such as butyl lithium, phenyl lithium, diethyl zinc.

Reaction with alkali metal amides in liquid ammonia gives metallation at the carbon sites, which may be followed by reaction with a transition metal chloride or organo-transition metal chloride to substitute the transition metal for the alkali metal.

Complexes may be formed, eg between nickel or cobalt and lithiocarboranes, dilithiocarboranes or sulfur compounds such as mercapto-o-carboranes.

Sigma-bonded transition metal derivatives may be formed by using Grignard reagents; thus bis-(cyclopentadienyl) titanium dichloride reacts easily with 1-bromo-magnesiomethyl-o-carborane to form bis-(cyclopentadienyl)-bis-(o-carboranylmethyl) titanium. Other transition metals, for example zirconium, react similarly.

Cage degradation, by treatment with 30% sodium hydroxide in THF and excess metal chloride at 100° C. for several hours, gives an oligomer carborane-metal-carborane-metal-carborane. Cobalt is an example of a metal that reacts in this way.

Polyhedral expansion reactions can also be used. Reduction of the carborane with an active form of sodium, eg sodium hydride, can be followed by addition of a metal, or metal complexes, usually metal and cyclopentadiene, or metal and cyclobutadiene, for example.

Direct insertion of a metal atom into the carborane cage can be achieved, generally with a metal carbonyl. Examples are pentacarbonyliron, or cyclopentadienyldicarbonylcobalt. These reactions are most suitable for the smaller carboranes, eg the $B_3C_2$ compounds.

All the above methods are known in themselves, and further details can be found in the literature. The sigma-bonded metal routes and the cage degradation methods are among those most preferred. The metal carborane compounds can be used in the invention as their various derivatives, such as halo, alkyl, haloalkyl, alkenyl, alkynyl, aryl and pyridyl carboranes, and carboxylic acids, esters, alcohols, alkoxides, ethers, aldehydes, ketones, nitrates and related compounds, amines, amides, azides, diazonium compounds, nitriles, borazine derivatives, silyl and alkylsilyl derivatives, alkoxysilanes, carbonylalkoxysilanes, siloxanes, silazanes and sulfur compounds such as thioethers. These can be prepared by known methods. Some of these derivatives include silicon and nitrogen, which may be desired in the final ceramic material, and carboxylic acid salts and alkoxides may include metals.

The most suitable carboranes are those from $B_2$ to $B_{20}$, with one or more carbon atoms, and groups attached to the carborane cage. Examples are the smaller compounds $B_3C_2H_5$, $B_4C_2H_6$, $B_5C_2H_7$ and $B_5CH_7$; the intermediate compounds $B_6C_2H_8$, $B_7C_2H_9$, $B_8C_2H_{10}$ and $B_9C_2H_{11}$; and the larger compounds $B_{10}C_2H_{12}$ and $B_{10}CH_{13}$. Other carboranes with single carbon atoms include $B_9CH_{10}$, $B_{10}CH_{11}$ and $B_{11}CH_{12}$. Particularly preferred are the small closo-carboranes, for example $B_5CH_9$, $B_4C_2H_8$, $B_3C_3H_7$, $B_2C_4H_6$ and $B_3C_2H_7$. These are susceptible to ready insertion of organometallic groups, for example by the Grignard route. However, the smaller carboranes are the more highly reactive in general, and stabler compounds can be formed with the $B_9$ or greater compounds.

Suitable metals for forming carborane metal compounds include most particularly titanium, vanadium, chromium, manganese, iron, cobalt, nickel, copper, aluminium, gallium, yttrium, zirconium, niobium, molybdenum, and tungsten; and for use with ceramic catalysts, the precious metals including platinum, palladium, iridium, rhenium, rhodium, osmium, gold, and palladium. Others include cadmium, calcium, cesium, and the lanthanoids. Transition metals are in general preferred; metalloids and non-metals that may also be incorporated include germanium, arsenic, phosphorus, sulfur and especially silicon.

It is to be understood that more than one metal species may be present, and it is one of the advantages of this invention that a selection of different ceramic precursors can be assembled and incorporated into the end product in the desired proportions.

The ceramic products of the invention have various uses, including the reinforcement of metals, ceramic matrix composites, and plastics. As fibres, the products of the invention, and especially those containing significant amounts of boron, exhibit good oxidation and heat resistance, and can show high strengths. Boron-containing ceramic catalysts can give increased yields, with high resistance to fatigue and to contamination and poisoning.

There is no reason why the polymer should not itself include metals. In the case of metal carboranes in particular, the carborane moiety may be part of the organic carrier polymer, which may then be used as a carrier for another organo-metallic ceramic precursor. Carborane polymers with a molecular weight range of from 8000 to 30000 are envisaged.

The polymer has several possible functions. For example it does, if required, serve as a physical support for the organo-metallic ceramic precursor, which may not by itself be a fibre-forming compound, or which may be capable of forming a fibre but not one strong enough to stand up to mechanical handling before pyrolysis. It can also provide a reliable fibre-forming component with which mixtures of ceramic precursor compounds can be spun. Another important function may be to provide a source of carbon, whether for formation of the ceramic carbide, or for formation of carbon fibres, the latter to increase the flexibility of the pyrolysed fibre and to inhibit crystal growth during pyrolysis. The organic polymer may itself include one or more metals, and to that extent may contribute further metal content to the ceramic product.

Suitable organic polymers include acrylic polymers, eg polyacrylonitrile; polyalkenes, eg polyethene and polypropene; polyesters; and cellulose. Where two polymers are used, for composite fibres, the first and second polymers may with advantage be immiscible.

The proportion of organo-metallic ceramic precursor in the organic polymer may be up to 98% by weight, provided that the polymer carrier retains its fibre-forming properties at such low proportions as 2%. Polyvinyl chloride and polypropene may be usable in these low amounts, whereas cellulose, for example, requires higher proportions to function as an effective fibre-forming carrier. It will also be appreciated that small quantities of the ceramic precursor will result in only low concentrations of ceramic in the end product, and in order to achieve the desired properties, higher proportions may be needed. More generally, the ceramic precursor is present at between 5 and 95%, and usually not more than 85%, of the total weight including the polymer carrier. In forming composite fibres, the proportion of the second polymer may be up to 95% by weight of the whole fibre before pyrolysis.

Suitable methods of fibre spinning include wet spinning, dry spinning, melt spinning, dispersion or emulsion spinning, and reaction spinning. These techniques are all well known in themselves. The selection will be dependent upon the natures and reactivities of the or each polymer and ceramic precursor. The polymer may be in a solvent, or not. If it is in a solvent, the ceramic precursor will be dissolved or dispersed in the same solvent.

The fibres may be shaped by selecting an appropriately shaped spinneret orifice.

In order to form the composite or multicomponent ceramic fibres, conjugate spinning or fibre blending may be employed. Conjugate spinning may be carried out by known methods that form composite bilateral, core-sheath or matrix-fibril fibre structures, for example. Blending after spinning may be by simple intermingling of similar or different fibres, or by such other means as co-winding, braiding or weaving the fibres, before pyrolysis.

As a general example, a dispersion of a first organo-metallic ceramic precursor in a first organic polymer can be co-extruded around a central core of a second polymer (which may optionally have a second, different, ceramic precursor dispersed in it). The second polymer may be from 5 to 85% of the whole, by weight, at the point of extrusion, the first organo-metallic ceramic precursor being not more than 85% of the whole fibre and more usually 35 to 75%, typically 55%. References to the first and second ceramic precursors should be understood as including mixtures of different species of ceramic precursor in each polymer carrier.

This is a general technique that is particularly valuable. Ceramic fibres that can be internally structured, and have variable compositions over their cross sections, offer outstanding advantages. Fibres of a specific internal composition for principal physical properties may be given a different surface by selecting the appropriate core/sheath materials before pyrolysis. Sophisticated surface barrier layers can be designed. Fibres destined for use as matrix reinforcements can be provided with enhanced matrix compatibility to resist pull-out, delamination and other problems. For example, a titanium carborane organo-metallic ceramic precursor in an organic polymer support can be spun as a sheath to a siloxane polymer core, to give after pyrolysis a silicon carbide core with a protective titanium diboride sheath for use in a titanium metal matrix.

It may be mentioned that references to composite fibres are not intended to be limited to fibres with only two regions, as a core and a sheath, but that more complex systems are envisaged. For example, an intermediate sheath may separate an incompatible core and outer sheath. The incompatibility might be chemical or physical. A carbon inner sheath derived from a simple organic polymer might be used as a chemical buffer between core and outer sheath, or as a region of intermediate expansion between a core which has a low coefficient of expansion and a high expansion outer sheath.

Composite fibres of which one component before pyrolysis is a silicon polymer are particularly useful, as they give a route to complex silicon carbide ceramic fibres. They may be made by conjugate spinning or by braiding or weaving techniques and the like. They include silicon chain polymers, and carbon chain polymers with silicon on side groups. Examples include polycarbosilanes, polysilazanes and various known organometallic-silicon polymer. Polysiloxanes are suitable, and may include desired metal species in the polymer. The use of a compatible metal as a bonding agent to, say, a sheath ceramic, may be an advantage. For use as matrix reinforcement, the sheath may typically be configured as carbide, carbonitride, carboboride, carbosilicide or carbosilicoboride to match the matrix with which compatibility is sought.

There are a wide range of other known silicon compounds that may be dispersed in one or both polymers to give a tailored ceramic interface between sheath and matrix, or between core and sheath, for use in developing compatible interfaces with silicon carbide ceramics. These include compounds of many metals with organosilicon compounds, siliconoxygen-boron compounds, silicon-oxygen-carbon compounds, compounds of the type $Si-C_n-M$, $Si-N-M$ or $Si-O-M$ (where M is the metal), and many others.

Other additives may be incorporated before pyrolysis. The product may benefit in various ways.

One possible additive is ground or powdered ceramics, already pyrolysed. These may be similar or dissimilar to the ceramic materials to be produced by the invention, and may be incorporated by mixing with the unpyrolysed polymer, or by surface coating it, in an amount up to 25% by weight, for example. Typical additives of this kind are silicon nitride, carbide or hexaboride; and carbides, nitrides, carbonitrides, carboborides, diborides, silicides and carbosilicides of transition metals, whether refractory or not.

Another possible additive is the ceramic oxide of the metal in the organometallic compound, in a controlled amount. The purpose is to use the oxide to remove excess carbon, to allow a closer approach to achieving stoichiometric target materials. Excess carbon in the ceramic product can reduce oxidation resistance. For example, the addition of powdered titanium oxide to an organotitanium ceramic precursor on a polymer support would provide both titanium to form titanium carbide with some excess carbon from the polymer and oxygen to remove further carbon.

A third category of additive is finely divided metals, silicon or boron. Up to 25% by weight will give rise to cermets upon pyrolysis. These can be chosen from similar materials to augment current properties, or from dissimilar materials in order to introduce new properties, such as compatibility with the matrix, hardness, stoichiometry and so on.

The fibres will normally be processed in the stages prior to pyrolysis by conventional means, as far as is allowed by their composition. For example, the spun fibres will be drawn to stretch them, so as to orient the polymer chains and develop tensile strength.

The fibres may be spun at initial diameters of, typically, 50 to 200 microns. Drawing and stretching may reduce this to an average of about 35 microns. Upon pyrolysis, a further loss of diameter down to about 3 to 15 or 20 microns may take place. The final diameter is chosen to match the requirements for the intended end use, by selecting the spinneret size and by controlling the degree of drawing and stretching.

It may be advantageous to give the spun fibre a pre-treatment in air, as is known in the production of carbon fibres from organic polymers. In some circumstances, a preliminary surface oxidation can be beneficial.

The composition after pyrolysis may typically include a weight percentage of metal of about 5 to 45%.

Pyrolysis temperatures of 500° to 2400° or even 2800° C. may be employed, more narrowly a minimum of 600° C. and a maximum of 2000° C., depending on the materials and their proportions. The duration of the process may also be adapted to the materials being used.

Pyrolysis may be carried out in an inert gas, in a reducing gas, or in a mixture; or indeed, in a vacuum. Examples of suitable gas atmospheres for the pyrolysis step include argon, helium, nitrogen, ammonia, methane, carbon monoxide, carbon dioxide, hydrogen and hydrogen/diborane mixtures. The atmosphere chosen will also reflect the nature of the materials and of the desired ceramic product. With carborane-borazine, amine or amide organo-metallic ceramic precursors, and where nitrides or carbonitrides are desired products, nitrogen and/or ammonia aid the reduction and the removal of gaseous by-products such as hydrogen chloride. Inert gases or methane may be used when carbides, silicides or carbosilicides are to be formed. Generally, carbon monoxide, carbon dioxide and hydrogen form reducing gas atmospheres, nitrogen and ammonia promote the formation of nitrides and carbonitrides, argon and helium provide inert atmospheres, and methane has a carburising effect to assist in the formation of carbides.

After the pyrolysis step, or integrated therewith, known techniques of ceramic modification can be applied, by subjecting the fibre at elevated temperatures (above 500° C., usually about 1000° to 1200° C.) to materials in vapour form. Suitable reactive species may include organometallic compounds, metal and non-metal halides (for example $TiCl_4$, $SiCl_4$ or $BCl_3$) and the like in suitable carrier gases. In general, the techniques known as chemical vapour infiltration may be applied as a separate step, or preferably integrated with the pyrolysis by being combined with it or following immediately thereafter.

After pyrolysis the product may be annealed at a lower temperature to heal micro defects in its structure and to improve the surface finish. A suitable gas atmosphere may be used at this stage, for example hydrogen for annealing cermets.

BRIEF DESCRIPTION OF THE DRAWINGS

The single accompanying drawing.

Figure 1:
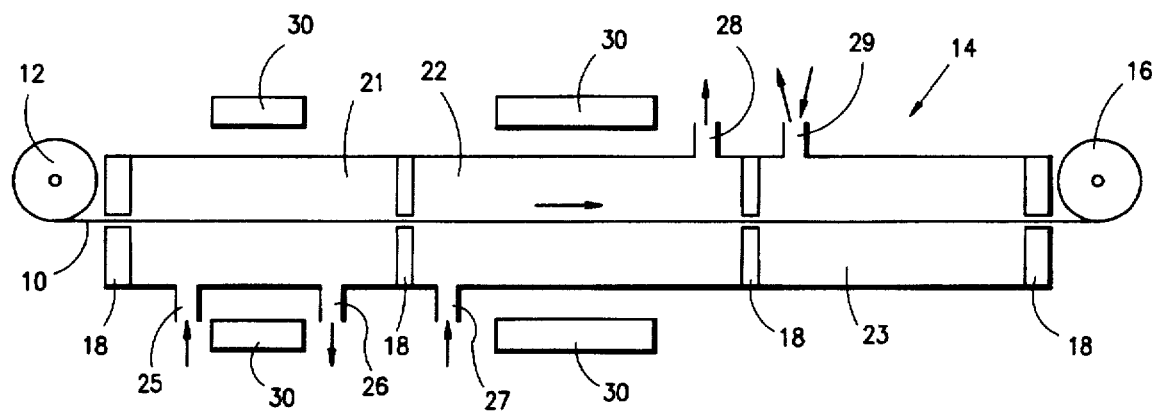
FIG. 1, is a diagrammatic representation of a general type of furnace suitable for carrying out the pyrolysis process.

In the drawing, a composite fibre 10 is wound from a spool 12 and fed into a furnace 14. After passing through the furnace the pyrolysed ceramic fibre product is taken up on spool 16.

Furnace 14 is divided into three chambers 21, 22, 23. Between the chambers, and at the entrance and exit to the furnace, are gas barriers 18 which are provided with seals for the passage of the fibre 10. These seals are of known kinds and may include electrical contacts to allow electric heating current to be conducted through the fibre.

Heaters 30 are provided as required. These may typically be radio frequency heaters, microwave heaters or induction coils.

The first chamber 21 is the polymer pyrolysis zone and is provided with a gas inlet 25 and a gas outlet 26; it may also be used with vacuum.

The second chamber 22 is a chemical vapour infiltration zone. It is provided with a gas inlet 27 and a gas outlet 28. The atmosphere in this zone includes species designed to break down and deposit or infiltrate upon the surface of the pyrolysed fibre and modify its outer layers as has been decribed above.

The third chamber 23 is an annealing zone and is provided with an optional gas inlet and outlet 29.

The following Examples illustrate the invention by particular reference to the formation of composite ceramic fibres by conjugate spinning methods using organo-metallic ceramic precursors supported in organic polymer carriers.

EXAMPLE 1

The organo-metallic ceramic precursors dicyclopentadienyl titanium dichloride and cyclopentadienyl titanium borohydride are dispersed in polyacrylonitrile, polyethene or polypropene. This is extruded as a sheath around a core comprising another organo-metallic ceramic precursor such as benzene chromium tricarbonyl or chromocene in another polymer carrier material such as cellulose or any other dissimilar immiscible polymer as a carrier fibre.

A composite fibre is formed on co-extrusion through a spinneret of between 50–200 microns, by wet, dry, melt or emulsion spinning techniques into a suitable atmosphere. The composite fibre is stretched during this process down to 50–35 microns, and wound on to a bobbin. It is subsequently pyrolysed, in an inert atmosphere of argon gas, during passage through a tube furnace, to give reel to reel monofilament or fibres (ie single fibres or a bundle of fibres). Pyrolysed fibre thickness may be down to 3 microns or less, as there is a loss of material during pyrolysis.

The products include titanium and chromium carboborides, and a mixture of carbides and borides to increase the oxidation resistance of the titanium between 500° C. and 750° C. (where titanium suffers from severe oxidation problems). These problems normally recur at 1500° C. and accelerate with increase in temperature; however, the addition of chromium refractory materials can reduce or even remove these oxidation problems up to 1550° C. The addition of boron to the transition metal increases the oxidation resistance, and decreases the coefficient of thermal expansion. The modulus of rupture is approximately the same as a pure carbide. The resistance to molten metals, eg iron, is increased; electrical resistance is increased; and the hardness, and therefore the durability of the product in terms of thermal shock resistance, are increased. The product is a complex mixture of transition metal carbides, borides, and carboborides; transition metal borides with boron carbide; boron carbide; and free carbon to retain the fibre's flexibility and to retard crystal growth.

EXAMPLE 2

A transition metal carborane, with one or more transition metal species, such as titanium, or titanium with vanadium, in a polyester carrier, is co-extruded around a cellulose core polymer containing another similar or dissimilar organometallic ceramic precursor such as cyclopentadienyl chromium tricarbonyl.

Extrusion is through a spinneret of between 50–200 microns, by wet, dry, melt, or emulsion spinning techniques, into a suitable atmosphere. The composite spun fibre is stretched during this process down to 50–35 microns and wound on to a bobbin. It is subsequently pyrolysed during passage through a tube furnace in an atmosphere of inert gas or hydrogen/diborane to give continuous reel to reel monofilament or fibres pyrolysed to a composite material comprising complex mixtures of transition metal carboborides, mixed transition metal carboborides, transition metal carbides, mixed metal carbides, metal borides, and free carbon.

EXAMPLE 3

An organo metallic transition metal carbonyl (vanadium being preferred by reason of its oxidation resistance) is dispersed in a carrier polyester polymer. Within it, a dissimilar transition metal carborane in a cellulose polymer is injected just before the point of extrusion to form a central core. In either or both of the polymers is a dispersion of a transition metal borohydride or transition metal carborane.

The whole is extruded through a spinneret of between 50–200 microns, by wet, dry, melt, or emulsion spinning techniques into a suitable atmosphere and then stretched during this process down to 50–35 microns and wound on to a bobbin.

Pyrolysis in an inert atmosphere of argon gas in a tube furnace gives continuous reel to reel monofilament or fibres comprising a complex mixture of transition metals, transition metal borides, transition metal carboborides, transition metal carbides, and boron carbide. The resultant alloys form with very complex phase assemblages, as not all of the materials have similar eutectics, and moreover they melt incongruently.

EXAMPLE 4

An organo-metallic ceramic precursor comprising dicyclopentadienyl titanium dichloride with dicyclopentadiene chromium is mixed into a small proportion of the polymer polypropene with a small proportion of chlorinated hydrocarbon solvent. Introduced into this as an immiscible polymer is cellulose containing either vanadium trimethylsilylmethyl, or vanadium-oxy trimethylsilyltrimethyl.

These organo-metallics are extruded through a spinneret of between 50–200 microns, by wet, dry, melt, or emulsion spinning techniques into a suitable atmosphere, and are stretched during this process down to 50–35 microns, and wound onto a bobbin.

The fibres are pyrolysed in an inert atmosphere by counter- or co-current gas flow in a linear fashion through a long thin furnace at a temperature between 800°–2000° C. to give continuous reel to reel fibres of complex transition metal carbides, transition metal carbosilicides, silicon carbides and transition metal silicides.

EXAMPLE 5

An organo transition metal ceramic precursor comprising titanium trimethylsilylmethyl mixed with dicyclopentadienyl titanium dichloride is dispersed in a polyester polymer. Extruded within this is a central core of an immiscible dissimilar polymer such as cellulose which contains, as an organo-metallic ceramic precursor, dicyclopentadienyl chromium (chromocene). Chromium promotes lower temperature oxidation resistance.

The two polymers are co-extruded to give a polyester sheath around a cellulose core, through a spinneret of between 50–200 microns, by wet, dry, melt, or emulsion spinning techniques into a suitable atmosphere, and are stretched during this process down to 50–35 microns. The fibre is wound on to a bobbin around another polymer fibre containing either similar complementary or dissimilar non-complementary organo-metallic compounds made by the same method.

The fibres are pyrolysed in an inert argon atmosphere in a counter-current or co-current gas flow through a long thin fibre drawing furnace at a temperature between 800°–2000° C. to give reel to reel fibres or monofilaments.

This gives a fibre with a complex mixture of transition metal carbides, transition metal suicides, transition metal borides, transition metal carboborides, and borocarbide.

EXAMPLE 6

As transition metal ceramic precursors, dicyclopentadienyl titanium chloroamide [(C$_5$H$_5$)$_2$TiCl]$_2$NH was dispersed in polyacrylonitrile, and the bimetallic compound cyclopentadienyl titanium dihydrodisilane [(C$_5$H$_5$)$_2$TiSiH$_2$]$_2$ was dispersed in a immiscible cellulose core to be coextruded with the polyacrylonitrile through a spinneret to form the multicomponent fibre (polyacrylonitrile sheath and cellulose core).

These are extruded through a spinneret of between 50–200 microns, by wet, dry, melt, or emulsion spinning techniques, into an ammonia atmosphere, and are stretched during this process down to 50–35 microns, and wound onto a bobbin before subsequent pyrolysis through a thin long furnace, in an atmosphere of inert gas, inert gas and ammonia, or hydrogen and ammonia at not more than 1450° C. to avoid the nitriles and amides forming cyanide gases, to give reel to reel fibres or monofilaments of a composite pyrolysed material containing transition metal nitrides, transition metal carbonitrides, transition metal silicides, siliconitrides, and silicocarbonitrides.

The fibres of Examples 1 to 6 have useful properties of high strength at elevated temperatures, reduced coefficient of friction, tensile strength, modulus of elasticity, electrical properties, and thermal shock resistance. These properties are modified by selection of the initial starting pre-ceramic organo-metallic compounds, the choice of polymer carrier fibre, the temperature of pyrolysis, and control of the gas atmosphere during pyrolysis.

The following example illustrates the formation of a composite ceramic fibre by blending different fibres before pyrolysis.

EXAMPLE 7

The organo-metallic ceramic precursors dicyclopentadienyl vanadium dichloride and cyclopentadiene zirconium dichloride in a polyester polymer are co-extruded around an immiscible cellulose core containing tribenzylchromium through a spinneret of between 50–200 microns, by wet, dry, melt, or emulsion spinning techniques into a suitable atmosphere, and are stretched during this process down to 50–35 microns, and wound on to a bobbin.

The fibre is then wound, woven or braided around another polymer fibre containing either similar and complementary or dissimilar and non-complementary organo-metallic compounds formed by similar methods. The blended fibres are then pyrolysed in an inert atmosphere in a counter- or co-current gas flow, linear fashion through a thin long tube furnace at a temperature of 800°–2000° C. to give reel to reel fibres.

This assigns properties of high strength, and utility in operations at elevated temperatures. This method permits processing two dissimilar materials without mixing and subsequent decomposition until pyrolysis.

EXAMPLE 8

About 5 g of fibre grade polyacrylonitrile is dissolved in 100 ml of dimethylformamide (DMF). About 5 g of sodium metal is dissolved in 100 ml DMF, which is then added to the polyacrylonitrile solution. After some hours the mixture has become a thick red gel. To this is added an equal weight of titanocene dichloride powder, which quickly dissolves with a sharp decrease in the viscosity of the solution.

If desired, refractory titanium diboride powder or other ceramics can be added either to increase the viscosity before extrusion or to adjust the chemical balance closer to a eutectic mixture in the anticipated product after pyrolysis.

The solution of organo-titanium complex in polyacrylonitrile polymer is extruded first into a heated atmosphere to remove some solvent for recycling and then into a water bath to form fibre, by any one of the known techniques for wet spinning polyacrylonitrile fibres.

The fibre can be stretched by Godot rollers and wound on to a bobbin at between 100° and 250° C., then slightly oxidised in air at 220° C. for 1 hour, before it is pyrolysed at 1400° C. in an atmosphere of nitrogen or, preferably, argon, for 1 hour, to form the desired ceramic fibre.

I claim:

1. A method of making a composite core-sheath ceramic fiber of nonhomogeneous composition which comprises spinning a composite polymeric fiber having a core region formed of a first polymeric fiber-forming material comprising at least one ceramic precursor, and a surrounding sheath region formed of a second polymeric fiber-forming material comprising at least one ceramic precursor, wherein at least one of said first and second polymeric fiber-forming materials is a dispersion of a non-fiber-forming organo-metallic ceramic precursor supported in a fiber-forming organic polymer carrier; and thereafter subjecting the spun composite polymeric fiber to pyrolysis conditions of temperature and controlled atmosphere whereby to convert said first polymeric fiber-forming material to a ceramic core and to convert said second polymeric fiber-forming material to a ceramic sheath surrounding said ceramic core, including converting said dispersed organo-metallic ceramic precursor into a metal:carbon ceramic compound.

2. A method according to claim 1 wherein the organometallic ceramic precursor is non-polymeric.

3. A method according to claim 1, wherein the organometallic ceramic precursor comprises a metal-organic coordination complex.

4. A method according to claim 3 wherein the complex is a pi-complex with cyclopentadiene.

5. A method according to claim 1, wherein the organometallic ceramic precursor comprises a metal derivative of a carborane.

6. A method according to claim 5 wherein the metal derivative of the carboranes comprises bis-(cyclopentadienyl)-bis(o-carboranylmethyl) titanium.

7. A method according to claim 5 wherein the organometallic ceramic precursor comprises a carborane-metal-carborane-metal-carborane oligomer.

8. A method according to claim 1 wherein the fiber forming organic polymer of said first and second polymeric fiber forming materials comprises an acrylic polymer, polyalkene, polyester, or cellulose.

9. A method according to claim 1 wherein the organometallic ceramic precursor is present at between 5 and 95% of the total weight of the composite fiber.

10. A method according to claim 1 wherein said second polymeric fibre-forming material is a dispersion of an organo-metallic ceramic precursor supported in a fibre-forming organic polymer carrier and is co-extruded around a core.

11. A method according to claim 10 wherein the core is from 5 to 85% of the composite fibre at the point of extrusion, the organo-metallic ceramic precursor being not more than 85% of the whole fibre, by weight.

12. A method according to claim 1, wherein one component of the composite fibre before pyrolysis is a silicon polymer.

13. A method according to claim 1, wherein a silicon compound is dispersed in at least one polymer before pyrolysis.

14. A method according to claim 13, wherein the compound is a compound of a metal with an organosilicon compound.

15. A method according to claim 1 wherein the organometallic ceramic precursor comprises an organo-metallic compound, and a ceramic oxide of the metal in the said compound is incorporated in the composite fibre before pyrolysis.

16. A method according to claim 10, wherein the spun fibre is given a preliminary surface oxidation pre-treatment in air prior to pyrolysis.

17. A method according to claim 1, wherein the composition of the ceramic after pyrolysis includes a weight percentage of metal of about 5 to 45%.

18. The method of claim 1 wherein said pyrolysis is conducted in a vacuum.

19. The method of claim 1 wherein said pyrolysis is conducted in a gas selected from the group consisting of argon, helium, nitrogen, ammonia, methane, carbon monoxide, carbon dioxide, hydrogen, and hydrogen/diborane mixture.

20. The method of claim 1 wherein said metal:carbon ceramic compound formed during said pyrolysis is selected from the group consisting of metal carbide, metal carbosilicide, metal carboboride, metal carbonitride, metal silicocarboride, and metal silicocarbonitride.

21. The method of claim 1 wherein said pyrolysis is conducted in an inert gas or methane and said metal:carbon ceramic compound formed during said pyrolysis is selected from the group consisting of metal carbide and metal carbosilicide.

22. The method of claim 21 wherein said pyrolysis is conducted in methane and said metal:carbon ceramic compound is metal carbide.

23. The method of claim 1 wherein said pyrolysis is conducted in a carburizing or nitriding atmosphere.

24. A method according to claim 1, including avoiding formation of oxide containing ceramic during said pyrolysis by conducting said pyrolysis under nonoxidizing conditions selected from the group consisting of: pyrolyzing in a vacuum, pyrolyzing in an inert gas, pyrolyzing in a reducing gas and pyrolyzing in a mixture of inert and reducing gas; whereby said dispersed organo-metallic ceramic precursor is converted into a metal:carbon ceramic compound.

25. A method according to claim 1 wherein the spun composite polymeric fibre is subjected to pyrolysis conditions of temperature and controlled atmosphere whereby the dispersed organo-metallic ceramic precursor and its organic polymer carrier are converted into a metal:carbon ceramic.

26. A method according to claim 25 wherein each of said first and second polymeric materials is a dispersion of an organo-metallic ceramic precursor supported in a fibre-forming organic polymer carrier.

27. A method according to claim 1 wherein said first polymeric fiber forming material which forms said core region is siloxane polymer whereby said siloxane polymer forms silicon carbide core during said pyrolysis, and said second polymer forming material which forms said sheath comprises titanium carborane organo-metallic precursor dispersed in a fiberforming organic polymer whereby said pyrolysis forms a protective titanium diboride sheath surrounding said silicon carbide core.

28. A method for making a ceramic fiber having a silicon carbide core surrounded by a titanium diboride sheath which comprises forming a polymer fiber having a siloxane polymer core surrounded by a polymeric sheath, said sheath being a dispersion of titanium carborane in an organic polymer support and then pyrolyzing said polymeric fiber while avoiding the formation of oxide containing ceramic during said pyrolysis by pyrolyzing said fiber under nonoxidizing conditions selected from the group consisting of: pyrolyzing in a vacuum, pyrolyzing in an inert gas, pyrolyzing in a reducing gas and pyrolyzing in a mixture of inert and reducing gas; thereby forming said ceramic fiber having a siliconcarbide core surrounded by a titanium diboride sheath.

29. A method of making a composite ceramic fiber of non-homogeneous composition which comprises spinning a plurality of polymeric fiber-forming materials each comprising at least one ceramic precursor into a composite fiber, at least one of said polymeric materials being a dispersion of a non-fiber-forming organo-metallic ceramic precursor supported in a fiber-forming organic polymer carrier, and thereafter pyrolyzing the composite fiber while avoiding formation of oxide containing ceramic during said pyrolysis by conducting said pyrolysis under non-oxidizing conditions selected from the group consisting of: pyrolyzing in a vacuum, pyrolyzing in an inert gas, pyrolyzing in a reducing gas and pyrolyzing in a mixture of inert and reducing gas; whereby said ceramic precursor is converted into a ceramic and said organo-metallic ceramic precursor is converted with carbon from said organic polymer carrier into a metal:carbon ceramic compound thereby forming said composite ceramic fiber of non-homogeneous composition.

* * * * *